United States Patent
Wang et al.

(10) Patent No.: US 10,678,779 B2
(45) Date of Patent: Jun. 9, 2020

(54) GENERATING SUB-INDEXES FROM AN INDEX TO COMPRESS THE INDEX

(71) Applicant: International Business Machines Corporation, Armonk, NY (US)

(72) Inventors: Xiaobo Wang, Beijing (CN); Shuo Li, Beijing (CN); Hong Mei Zhang, Beijing (CN); Shu Hua Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 15/839,682

(22) Filed: Dec. 12, 2017

(65) Prior Publication Data

US 2019/0179933 A1   Jun. 13, 2019

(51) Int. Cl.
  *G06F 7/00* (2006.01)
  *G06F 16/00* (2019.01)
  *G06F 16/23* (2019.01)
  *G06F 16/22* (2019.01)

(52) U.S. Cl.
  CPC ...... *G06F 16/2365* (2019.01); *G06F 16/2272* (2019.01)

(58) Field of Classification Search
  USPC .................................................. 707/688–703
  See application file for complete search history.

(56) References Cited

U.S. PATENT DOCUMENTS

| | | | |
|---|---|---|---|
| 2009/0319550 A1* | 12/2009 | Shau | G06F 16/284 |
| 2010/0114843 A1 | 5/2010 | Farrar et al. | |
| 2012/0296881 A1 | 11/2012 | Christian et al. | |
| 2014/0324875 A1* | 10/2014 | Gudeman | G06F 16/2272 707/741 |
| 2016/0171053 A1 | 6/2016 | Shergill et al. | |
| 2017/0116280 A1* | 4/2017 | Shergill, Jr. | G06F 16/2343 |

OTHER PUBLICATIONS

Author, G., "Compressing your Indexes: Index Key Compression (Part 1)", Mar. 15, 2016, [Retrieved on Jul. 28, 2017]. Retrieved from the Internet at URL: https://blogs.oracle.com/dbstorage/compressing-your-indexes:-index-key-compression-part-1 , Total 8 pp.

Author, G., "Compressing your Indexes: Advanced Index Compression (Part 2)", Mar. 25, 2016, [Retrieved on Jul. 28, 2017]. Retrieved from the Internet at URL: https://blogs.oracle.com/dbstorage/compressing-your-indexes:-advanced-index-compression-part-2 , Total 7 pp.

* cited by examiner

*Primary Examiner* — Tuan A Pham
(74) *Attorney, Agent, or Firm* — Konrad Raynes Davda & Victor LLP; David W. Victor (57) ABSTRACT

Provided are a computer program product, system, and method for generating sub-indexes from an index to compress the index. An index has levels of nodes for a composite key comprised of component keys. Each node includes at least one composite key value comprised of component key values. A plurality of sub-indexes is generated including one sub-index for each component key of the composite key. Nodes are generated in each sub-index corresponding to nodes in the index. In each node of the nodes of the sub-index, a component key value is generated, for the component key for which the sub-index was generated, from at least one composite key value in the corresponding node of the index. The sub-indexes are used to search for a record matching a search composite key value in the database using component key values of the search composite key value.

23 Claims, 9 Drawing Sheets

FIG. 5
Sub-Index Internal Node

FIG. 6
Sub-Index Leaf Node for Non-Last Component Key

FIG. 7
Sub-Index Leaf Node for Last Component Key

GENERATING SUB-INDEXES FROM AN INDEX TO COMPRESS THE INDEX

BACKGROUND OF THE INVENTION

1. Field of the Invention

The present invention relates to a computer program product, system, and method for generating sub-indexes from an index to compress the index.

2. Description of the Related Art

A database index may be implemented as a b-tree of nodes, having a root node, one or more levels of internal nodes and leaf nodes having key values for records in a database. The internal nodes include key values used to traverse the index, such that the search key is compared to the key values in the index to determine which child node to traverse through in the B-tree. In certain instances, a key may comprise a composite key comprised of multiple component keys, where each of the component keys correspond to a field, column or other defined entry in the database record.

There is a need in the art for improved computer technology to implement the binary tree index.

SUMMARY

Provided are a computer program product, system, and method for generating sub-indexes from an index to compress the index. An index is comprised of a plurality of levels of nodes for a composite key comprised of component keys, wherein each node of the nodes includes at least one composite key value comprised of component key values. A plurality of sub-indexes is generated in the computer storage device including one sub-index for each component key of the component keys of the composite key. Nodes are generated in each sub-index corresponding to nodes in the index. In each node of the nodes of the sub-index, a component key value is generated, for the component key for which the sub-index was generated, from at least one composite key value in the corresponding node of the index. The sub-indexes are used to search for a record matching a search composite key value in the database using component key values of the search composite key value.

DETAILED DESCRIPTION

In current database indexes having composite key values of multiple component key values, the composite key values in the internal or non-leaf nodes may have duplicate component keys, which may take up considerable storage space and page buffer space in memory. Described embodiments provide improvements to database index technology to compress an index by generating sub-indexes, where one sub-index is generated for each component key of the composite key. The nodes in each sub-index only include the component key value, and nodes in a last level of the sub-indexes, other than the last sub-index, remove duplicate component key values by having only one instance of a component key value represent multiple instances of the component key value in the node in the uncompressed index. This removing of duplicate component key values for composite keys in the uncompressed index reduces the space required to store the index by removing duplicate instances and reduces the component keys in a sub-index that need to be searched.

Described embodiments further provide improved data structures for implementing the sub-indexes that indicate component key values of a composite key value at the nodes of the sub-index to conserve space. Further, with the described embodiments, the number of levels searched remains the same, because after locating a component key value in one sub-index, the searching continues from that located component key value in the next sub-index, which may be at the same level of the sub-index at which the component key value was located. Yet further, searching is faster, because at each node, only the component key value is compared, not the entire composite key value.

Figure 1:
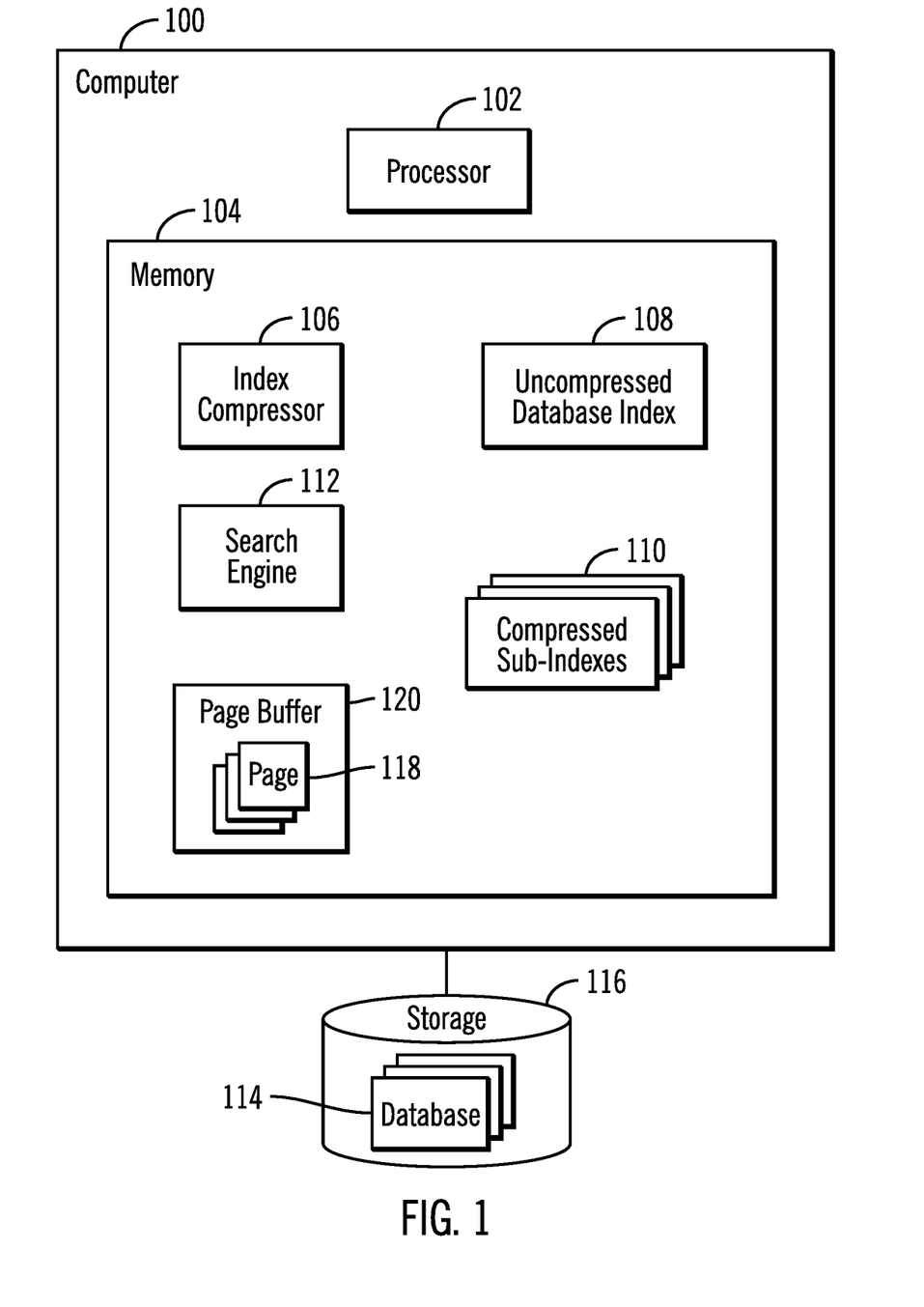
FIG. 1 illustrates an embodiment a computing environment.

FIG. 1 illustrates an embodiment of a computing environment. A computer 100 includes a processor 102 and a memory 104 having an index compressor 106 to compress composite keys, comprised of component keys, at the nodes of an uncompressed database index 108. The index compressor 106 generates compressed sub-indexes 110 for the component keys of a composite key at the nodes of the index 108. The compressed sub-indexes 110 remove duplicate component key values at the nodes of the uncompressed index 108. The memory 104 further includes a search engine 112 to process search queries using the sub-indexes 110 generated for an index 108 of a database 114 in a connected storage 116. Records of the database 114 that are accessed using the sub-indexes 110 are stored in pages 118 in a page buffer 120 in the memory 104 to be available for access to return to search requests.

In one embodiment, the memory 104 may comprise a volatile or non-volatile storage, such as a Dynamic Random Access Memory (DRAM), flash memory, Random Access Memory (RAM) or a non-volatile memory, e.g., battery backed-up Random Access Memory (RAM), static RAM (SRAM), storage-class memory (SCM), etc., Phase Change Memory (PCM), resistive random access memory (RRAM), spin transfer torque memory (STM-RAM), conductive bridging RAM (CBRAM), etc.

The storage 116 may comprise a non-volatile storage, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The storage 116 may be configured from an array of devices, such as Just a Bunch of Disks (JBOD), Direct Access Storage Device (DASD), Redundant Array of Independent Disks (RAID) array, virtualization device, etc.

The index compressor 106 and search engine 112 may comprise one or more programs loaded into the memory 104 that are executed by the processor 102 or may be implemented in one or more hardware devices in the server 100, such as in Application Specific Integrated Circuits (ASIC). In computer program implementations, the memory 104 may include additional programs for the computer 100 to operate, such as an operating system, drivers, etc.

Figure 2:
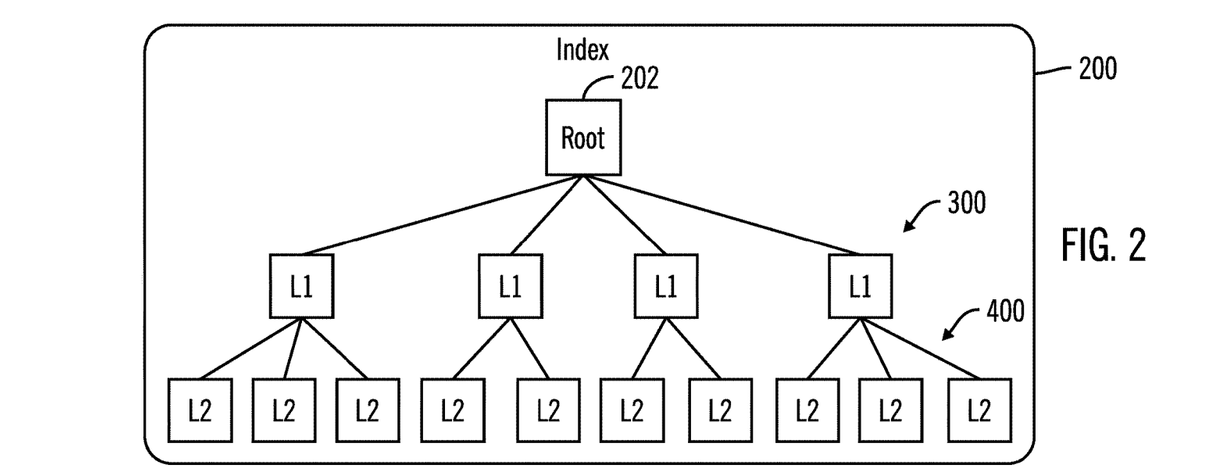
FIG. 2 illustrates an example of a binary tree.

FIG. 2 illustrates an embodiment of an instance of an index 200, such as indexes 108, 110, as a tree data structure having a root node 202, internal nodes 300 (also known as non-leaf nodes), and leaf nodes 400. There may be one page 118 in the memory 104 allocated to each node, leaf and internal. Each leaf node 400 may have one or more composite key values and information, such as record IDs, used to access the records having key values of the composite key value. The internal nodes 300 include one or more composite key values and links to one or more other levels of internal nodes 300 or leaf nodes 400. The composite key values of the internal nodes 300 are used to traverse the tree structure representing the database records to access the leaf nodes 400 having the information on the data set records. The composite key values in the internal 300 and leaf 400 nodes may be comprised of multiple component key values, which may be duplicated in the composite key values at the nodes. Described embodiments provide techniques to generate sub-indexes that remove duplicate component key values in the composite key values at the nodes.

Figures 3, 4:
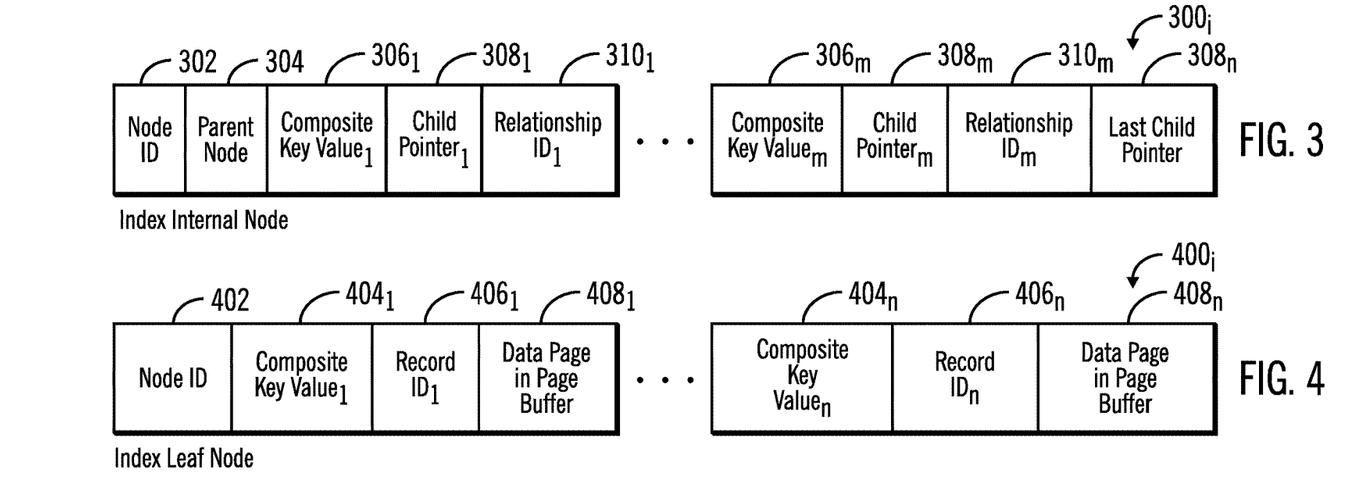
FIG. 3 illustrates an embodiment of an index internal node.
FIG. 4 illustrates an embodiment of an index leaf node.

FIG. 3 illustrates an embodiment of information in a data structure maintained for an index internal node $300_i$ in the index 200, which may be implemented as a page 118 in the memory 104. An internal node is a node $300_i$ between the root node 202 and the leaf nodes 400, such as nodes 300. The index internal node $300_i$ includes a node identifier (ID) 302; a parent node 304 in the tree data structure index 200 comprising the root node 202 or another internal node. For each of the one or more child nodes of the node $300_i$, except the last child node, the internal node $300_i$ includes a composite key value $306_1 \ldots 306_m$, a child pointer $308_1 \ldots 308_m$ pointing to a next node to traverse to at a lower depth/level of the tree if a search composite key value is less than the composite key value $306_j$ and greater than a previous composite key value $306_i$, and a last child pointer $308_n$ pointing to a child node to traverse to if the composite search key value is greater than the last composite key value $306_m$ in the node $300_i$. The pointers $308_1 \ldots 308_m, 308_n$ point to a page 118 in the memory 104 having information for a next node in the tree, comprising an internal node $300_i$ or leaf node $400_i$.

FIG. 4 illustrates an embodiment of information in a data structure maintained for an instance of a leaf node $400_i$ in an index 108, 200, which may be implemented as a page 118 in the memory 104, including a node ID 402 identifying the leaf node; one or more composite key values $404_1 \ldots 404_n$ of the composite key values for records in the database 114 and record identifiers $406_1 \ldots 406_n$ to identify the corresponding records in the database having the composite key values $404_1 \ldots 404_n$. A data page in the page buffer $408_1 \ldots 408_n$ identifies the page 118 in the memory 104 having the records with the composite key values $404_1 \ldots 404_n$.

The composite key values $306_i$, $404_i$ are comprised of component key values and provide values for fields, information, columns, etc. in the database records, and a search key would provide component key values of a composite key to use to traverse the index 108, 200 based on the composite keys in the index nodes $300_i$, $400_i$.

To eliminate redundant keys in the index node, the index compressor 106 may generate sub-indexes 110, comprising tree data structures, where there is one sub-index generated for each component key of the composite key and has a depth level equal to the number of a position of the component key in the composite key. For instance, the sub-index $110_1$ for the first component key of the composite key would have a depth level of one, or one level of nodes following the root node 202, and the ith sub-index $110_i$ for the ith component key would have a depth level of i. Only the sub-index for the last component key of the composite key may have the leaf nodes of the uncompressed index 108, and the sub-indexes for component keys other than the last component key would only include component keys from the composite keys in the internal nodes from the uncompressed index 108 up through the ith level of internal nodes 300. Each node of a sub-index 110 may only include the component key value from the composite key value in the corresponding node in the uncompressed index 108 for which the sub-index was generated, i.e., sub-index $110_i$ node would include the ith component key values for the composite key values in the corresponding uncompressed index 108 node.

Figure 5:
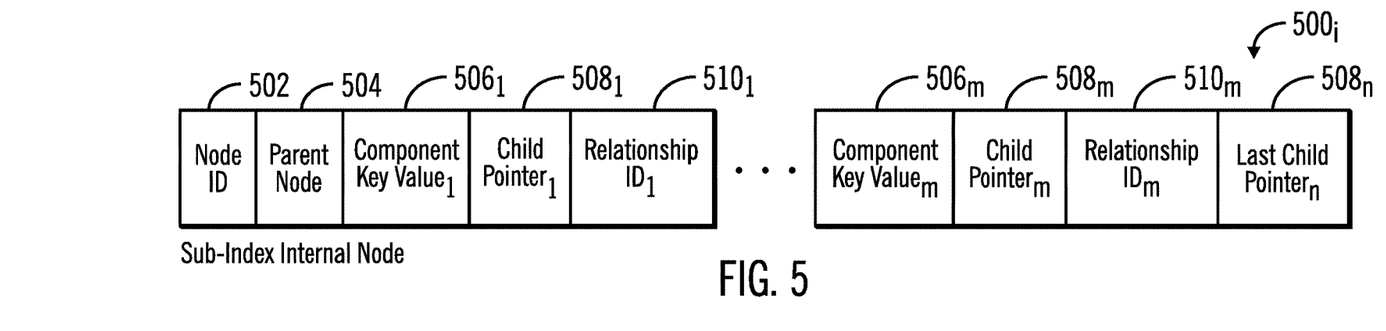
FIG. 5 illustrates an embodiment of a sub-index non-leaf node for a non-last component key of a composite key.
Figure 6:
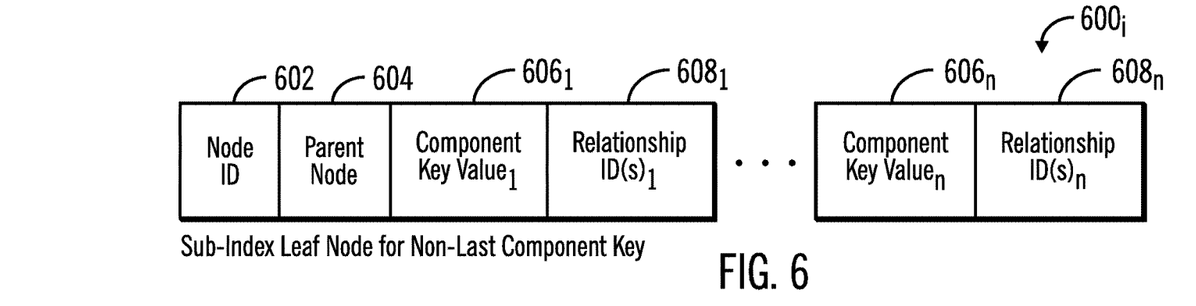
FIG. 6 illustrates an embodiment of a sub-index non-leaf node for a last component key of the composite key.
Figure 7:
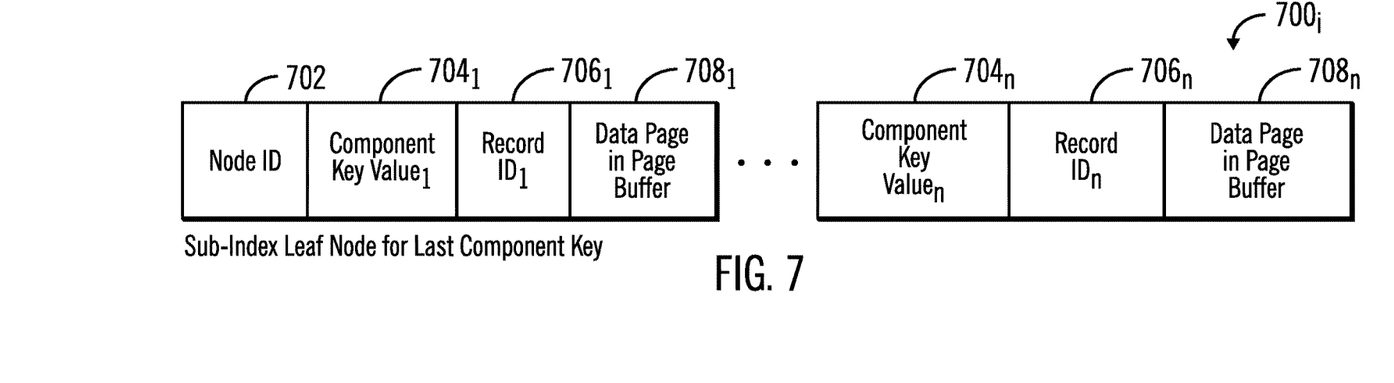
FIG. 7 illustrates an embodiment of a sub-index leaf node for the last component key.

FIGS. 5, 6, and 7 provide embodiments of data structures in the memory 104 to implement the different types of nodes in a sub-index $110_j$ including a sub-index internal node $500_i$ of the sub-index $100_j$, a sub-index leaf node $600_i$ of the sub-index $110_i$ for a component key which is not a last component key of the composite key, i.e., non-last component key, and a sub-index leaf node for the last component key $700_i$, i.e., last component key of the composite key.

FIG. 5 illustrates an embodiment of information in a data structure maintained for a sub-index internal node $500_i$ for a sub-index $100_j$, which may be implemented as a page 118 in the memory 104. The sub-index index internal node $500_i$ includes a node identifier (ID) 502 and a parent node 504 in the tree data structure index 200 comprising the root node 202 or another internal node. For each of the one or more child nodes of the node $500_i$, except the last child node, the internal node $500_i$ includes a component key value $506_1 \ldots 506_m$ for the component key for which the sub index was generated; a child pointer $508_1 \ldots 508_m$ pointing to a next node to traverse to if a search component key value is less than the component key value $506_j$ and greater than a previous component key value $506_i$, and a last child pointer $508_n$ pointing to a child node to traverse to if the component search key value is greater than the last component key value $506_m$ in the node $500_i$; and a relationship identifier $510_1 \ldots 510_m$ providing a unique identifier of the internal node composite key value from which the component key value $506_1 \ldots 506_m$ was generated. The relationship identifier may comprise a unique record identifier that does not identify a particular record in the database 114, but instead identifies a composite key value from which the component key value was generated. The pointers $508_1 \ldots 508_m$, $508_n$ point to a page 118 in the memory 104 having information for a next node in the tree, including an internal node $500_i$ or leaf node $400_i$.

FIG. 6 illustrates an embodiment of information in a data structure maintained for a sub-index leaf node for the non-last component key $600_i$, i.e., the sub-index $110_i$ for a component key i of the composite key other than the last component key n in the composite key, which may be implemented as a page 118 in the memory 104. The leaf nodes $600_i$ for the sub-index $100_i$ for the non-last component key i correspond to the internal nodes at the ith level from the root node 202 of the uncompressed index 108. The sub-index index leaf node for the non-last component key $600_i$ includes a node identifier (ID) 602 and a parent node 604 in the tree data structure 200 for the sub-index $110_i$ comprising the root node 202 or another internal node $500_i$. For each of the composite keys in a corresponding internal node at the ith level from the root node of the uncompressed index 108, the sub-index leaf node $600_i$ includes a component key value $606_1 \ldots 606_n$ comprising the component key value in the corresponding composite key value $306_j$ in the corresponding internal node $300_j$ of the uncompressed index 110i and one or more relationship IDs $608_1 \ldots 608_n$ of one or more composite key values $306_j$ having the component key value $606_1 \ldots 606_n$. In this way, in the sub-index leaf nodes, duplicate component key values are consolidated in a single component key value having the relationship IDs $608_j$ of the composite key values in the uncompressed index having that same component key value.

FIG. 7 illustrates an embodiment of information in a data structure maintained for an instance of a sub-index leaf node for the last component key $600_i$, i.e., the sub-index $110_n$ for the last component key of the composite key, which may be implemented as a page 118 in the memory 104. The leaf nodes $700_i$ for the sub-index $100_i$ for the last component key n correspond to the leaf nodes $300_i$ of the uncompressed index 108. The sub-index leaf node $700_i$ includes a node ID 702 identifying the leaf node; one or more component key values $704_1 \ldots 704_n$ of the composite key values in the corresponding index leaf node $300_i$ for records in the database 114; record identifiers $706_1 \ldots 706_n$ to identify the corresponding records in the database; and a data page in the page buffer $708_1 \ldots 708_n$ identifies the page 118 in the memory 104 having the records with for the record identifiers $708_1 \ldots 708_n$.

Figure 8:
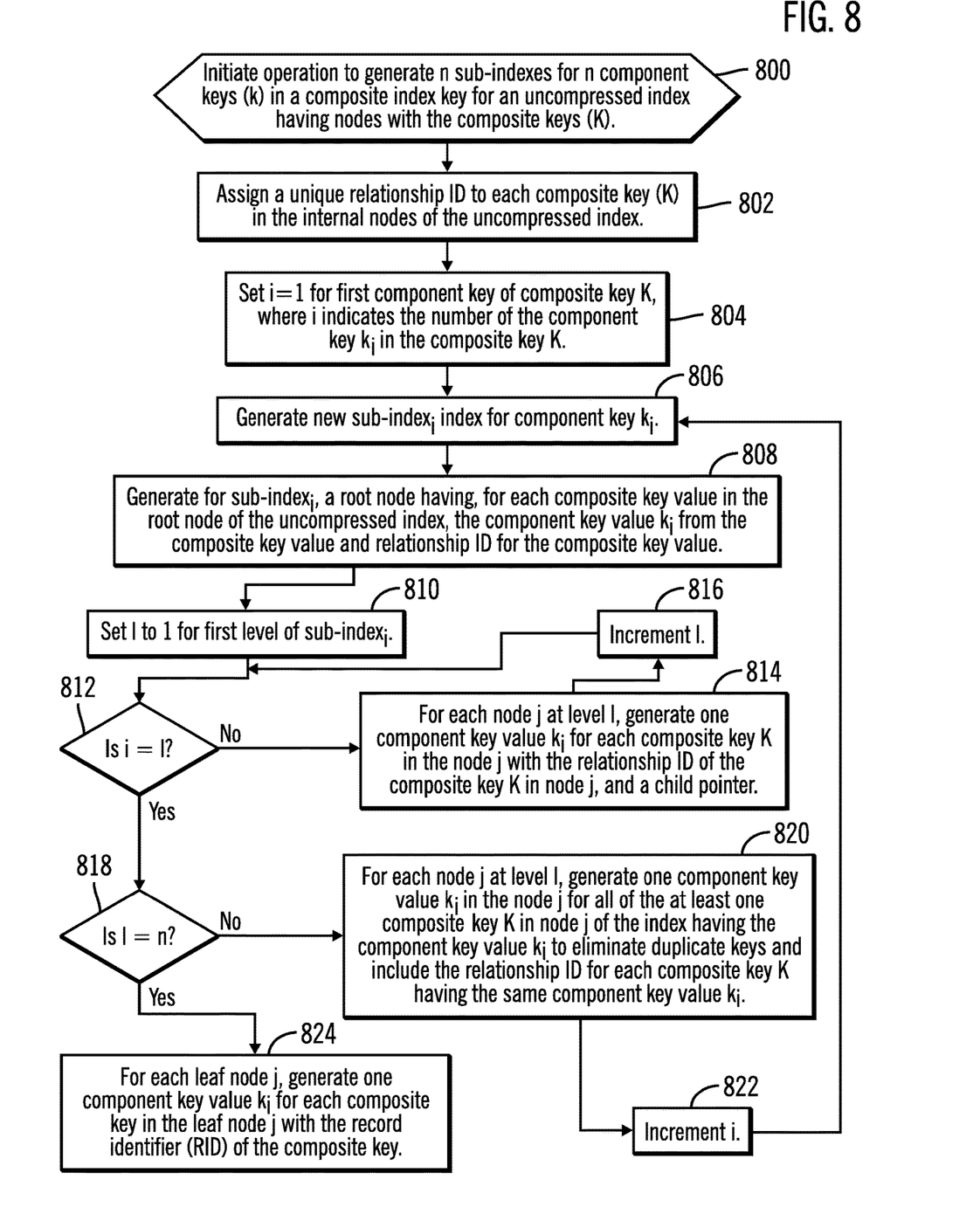
FIG. 8 illustrates an embodiment of operations to generate sub-indexes from a database index.

FIG. 8 illustrates an embodiment of operations performed by the index compressor 106 to generate sub-indexes 110 from an uncompressed index 108 that removes duplicate keys from the keys in the index nodes to compress the index 108. Upon initiating (at block 800) an operation to generate n sub-indexes 110 for n component keys (k) from composite key values in nodes in the uncompressed index nodes $200_i, \ldots 300_i$, the index compressor 106 may assign (at block 802) a unique relationship ID $310_i$ to each composite key value in the non-leaf nodes, e.g., root and internal nodes, of the uncompressed index 108. The index compressor 106 sets (at block 804) i to 1 for the first component key ($k_1$) of the composite key K, where i indicates the number of the position of the component key ($k_i$) in the composite key K. A new sub index $110_i$ is generated (at block 806) for component key $k_i$, having nodes corresponding to the i levels of the uncompressed index 108 following the root node 202. The index compressor 168 generates (at block 808) for sub-index $110_i$ a root node having, for each composite key value $306_j$ in the root node 202, the component key value $506_j$ for the composite key value $306_j$, a child pointer $508_j$ to point to a node at the next level, and the relationship ID $510_j$ comprising the relationship ID $310_j$ for the corresponding composite key value $306_j$ from the uncompressed index 108.

A loop of operations is performed at block 810-824 for each level in the uncompressed index 108 up through the number i of the key component ($k_i$) of the composite key for which the sub-index $110_i$ is being generated. The level variable l is set (at block 810) to one for the first level of sub-index $110_1$. If (at block 812) i is not equal to level l, then the level being generated is not the last level of the sub-index $110_i$, and the index compressor 106 generates (at block 814), for each node j at level l, one component key value $506_k$ for each composite key K in the node j with the relationship identifier $510_K$ of the composite key K from which the component key value $506_k$ is generated. A child pointer $508_k$ may also be generated to point to a node at the next level. In this way, sub-index internal nodes only include the component key value of the composite keys in the corresponding node in the uncompressed index 108. The level l is incremented (at block 816) and control proceeds back to block 812 to generate the nodes for the next level of sub-index $110_i$.

If (at block 812) the position number i of the component ($k_i$) for which the sub-index $110i$ is being generated is equal to the level l of nodes currently being generated, then the last level of the sub-index $110_i$ is being processed and the index compressor 106 determines (at block 818) whether the level number (l) is n, which means the level l being considered of sub-index $110_i$ is the last level for the last component key $k_n$ of the composite key K and is also the level of leaf nodes 400 of the uncompressed index 108. If (at block 818) the level l does not equal n, then the index compressor 106 generates (at block 820), for each node j at the last level n of the index 108, one component key value $k_i$ $606_k$ in the node j for all of the at least one composite key value $306_k$ in node j, of the uncompressed index 108, having the component key value $606_k$ to eliminate duplicate keys in the corresponding node $200_j$ of the uncompressed index 108. The relationship ID $310_k$ for each composite key value $306_k$ in the index 108 having the same component key value $606_k$ is included with the relationship IDs $608_k$ for the component key value $606_k$. After generating the nodes for the last level of the non-last sub-index $110_i$, i.e., i<n, the variable i is incremented (at block 822) for the next sub-index $110_{i+1}$ to be generated and control proceeds back to block 806 to generate the next sub-index $110_{i+1}$.

If (at block 818) level l=n, then, then the index compressor 106 generates (at block 824), for each leaf node $400_j$ in the uncompressed index 108, one component key value $704_k$ for each composite key value $404_k$ in the leaf node $400_j$ with the record identifier (RID) $706_k$ comprising the record identifier $406_k$ of the composite key value $404_k$. The data page in page buffer $708_k$ may also be included from the data page $408_k$ in the index leaf node $400_j$.

With the embodiment of FIG. 8, the index compressor 106 reduces duplicate component keys in the composite keys of the uncompressed index 108 by generating sub-indexes for the component keys that reduce space by only including the component key value in each node of the sub-index for the composite keys in the corresponding nodes in the uncompressed index. Further, for the leaf nodes of sub-indexes for the non-last component key of the composite key, duplicate composite key values are eliminated by only generating in the sub-index one component key value for all composite keys having that same component key value. This provides further compression in the sub-indexes.

Figure 9:
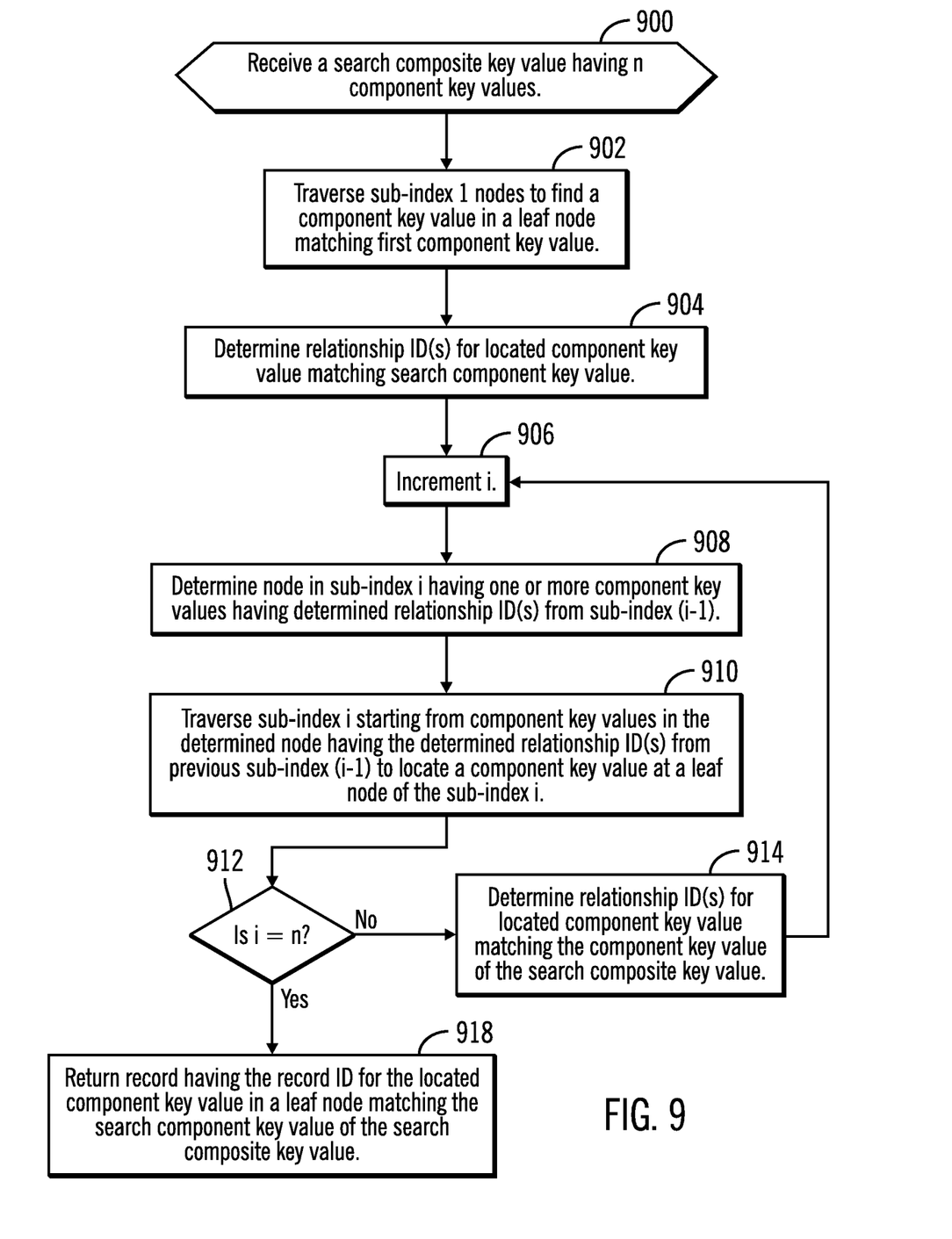
FIG. 9 illustrates an embodiment of operations to use the sub-indexes to process a database search query.

FIG. 9 illustrates an embodiment of operations performed by the search engine 112 to perform a search using sub-indexes 110. Upon receiving (at block 900) a search composite key having n component keys, the search engine 112 traverses (at block 902) first sub-index $110_1$ nodes $500_i$ to locate a leaf node $600_i$ to find a component key value $606_j$ matching the first component key value of the search composite key value. The one or more relationship IDs $608_j$ are determined (at block 904) for the located component key value $606_j$. The variable i is incremented (at block 906) to process the next sub index $110_{i+1}$. The search engine 112 determines (at block 908) a node $500_i$ in the sub-index $110_i$ having the one or more component key values $506_j$ that have relationship IDs $510_j$ comprising the determined one or more relationship IDs $608_j$ from the previous sub-index $110_{i-1}$. Starting from this point of the determined component key values $506_j$, the search engine 112 traverses (at block 910) sub-index $110_i$ starting from the determined component key values $506_j$ in the determined node $500_i$ having the relationship ID(s) $510_j$, determined (at blocks 904 or 914) from the previously considered previous sub-index $110_{i-1}$, to reach a component key value at a leaf node of the next sub-index i.

To traverse the nodes, the search engine 112 traverses down an edge defined by a child pointer $508_i$ to a next node at the next level based on a comparison of the search component key value with the component key values $506_i$ for the child pointers 508i in the current node $500_i$. For instance, if the search component key value is less than or between two component key values $506_{j-1}$ and $506_j$ in the node $500_i$, then the search engine 112 traverses down the edge defined by the child pointer $506_j$ for the component key value $506_i$ greater than the search component key value in an ordering of the values. If the search component key value is greater than the last component key value $506_m$ in the node $500_i$, then the search engine 112 traverses to the node at the last child pointer $510_n$.

If (at block 912) i is not equal to n, which means the next sub-index $110_n$ being processed is not for the last component key $k_n$ of the composite key K, then the search engine 112 determines (at block 914) the relationship ID(s) $608_j$ for located component key value $606_1$ matching the search component key value of the search composite key. Control then proceeds back to block 906 to process the next sub index $110_{i+1}$. If (at block 912) the last sub-index $110_n$ for the last component key $k_n$ is being processed, then the located component key value $704_j$ is for the composite key value being searched in a leaf node 400 for the index 108, and the search engine 112 returns (at block 918) the record for the record $704_j$, which may be returned from the data page $708_j$ in the page buffer 120 or accessed from the database 114.

With the operations of FIG. 9, the search engine 112 may use a sub-index $110_i$ to search on a component key value of a search composite key value to determine the relationship IDs for a matching component key value to then use to determine the node and component keys in the next sub-index $110_{i+1}$ at which to start searching for the next component key $k_{i+1}$ of the search composite key K. In this way, the number of levels of sub-index traversed are the same as with the uncompressed index 108, and the searching involves faster matching because only the component keys are compared in the searching in the sub-indexes $110_i$. Further, duplicate component keys are eliminated, further reducing the searching.

Figure 10:
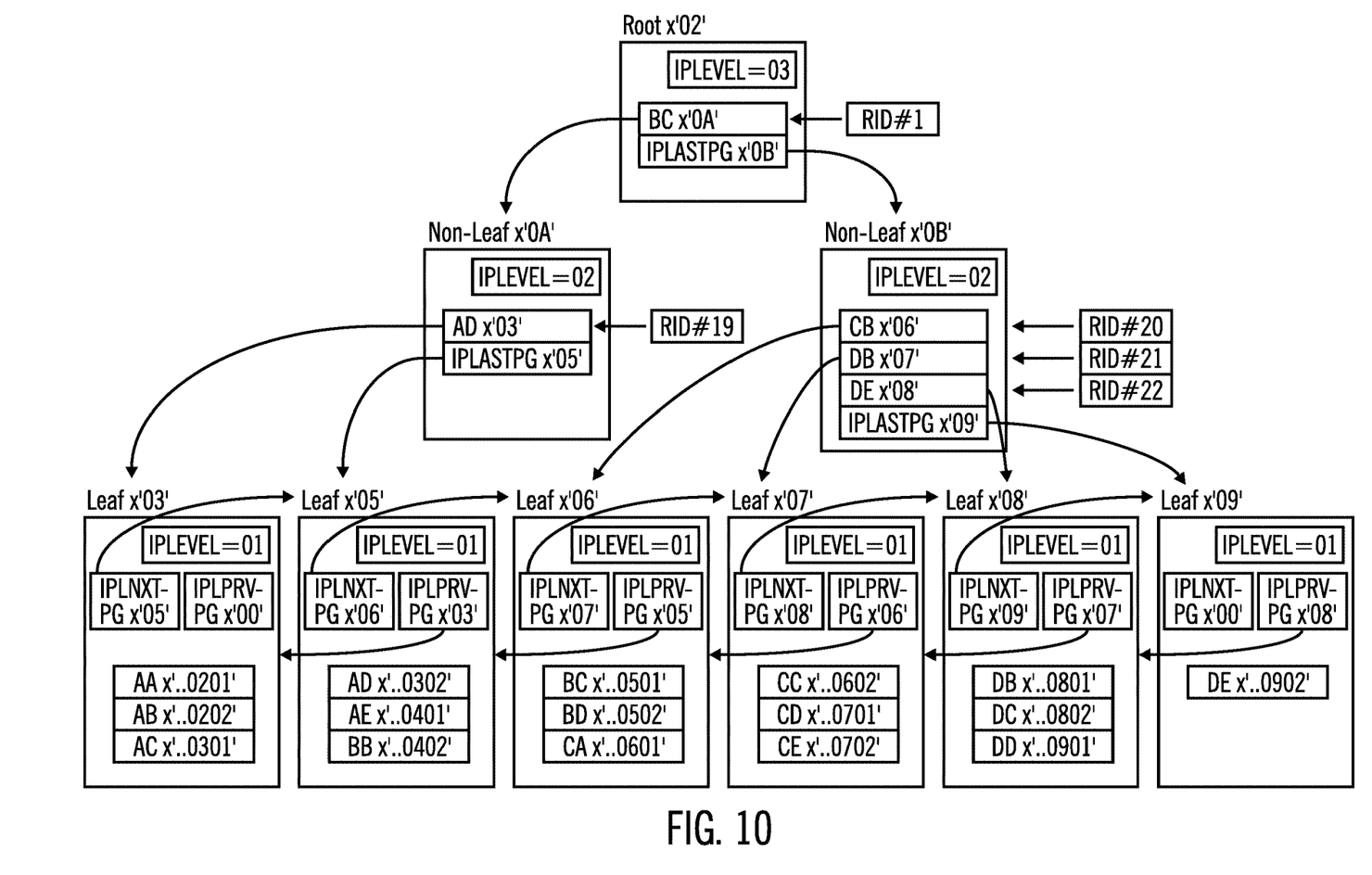
FIG. 10 illustrates an example of an index in accordance with described embodiments.

FIG. 10 illustrates an example of an uncompressed index having a composite key comprised of two characters, a root node and two levels following the root node. The relationship identifiers are shown as RID #1, 19, 20, 21, and 22. IPLEVEL refers to index page level, which indicates the level, and the page including the node information is identified as x'02, X'0A, x'0B, x'01 . . . x'09. In the leaf level, the page including the identified records is labeled as x'0201, x'0301, x'0401, etc.

Figure 11:
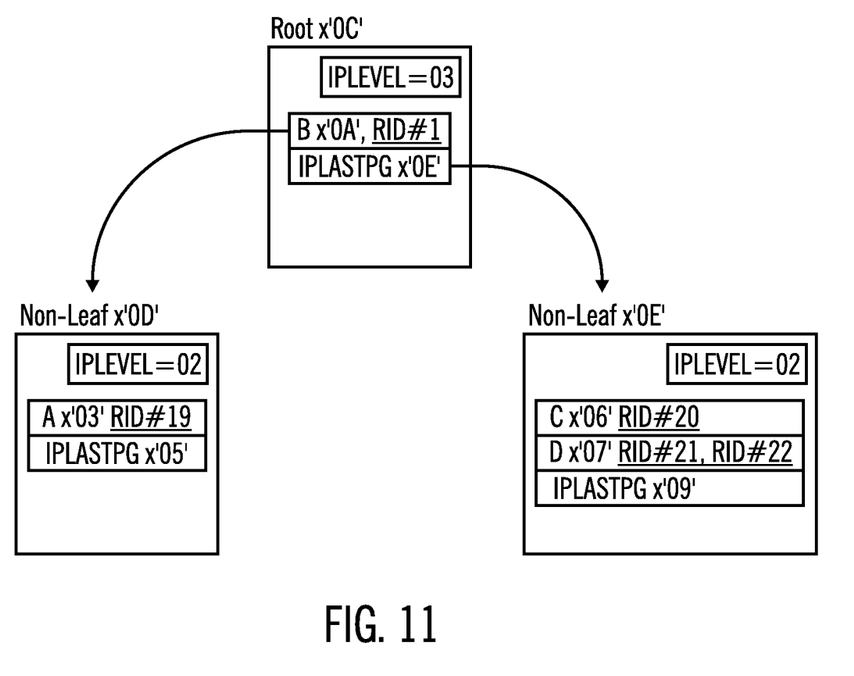
FIG. 11 illustrates an example of a sub-index for a component key of the composite key that is not the last component key in the composite key in accordance with described embodiments.

FIG. 11 illustrates an example of a first sub index for the index shown in FIG. 10, having one level of nodes for the first component key value and the relationship IDs (RID # s) for the composite key having the generated first component key value. In the example of FIG. 11, the generate component key "D" has two relationship IDs, RID #21, RID #22 because there were two composite key values DB and DE having duplicate first component key value "D". In this way, the first sub-index in FIG. 11 removes duplicate entries in the last level of nodes for this sub-index.

Figure 12:
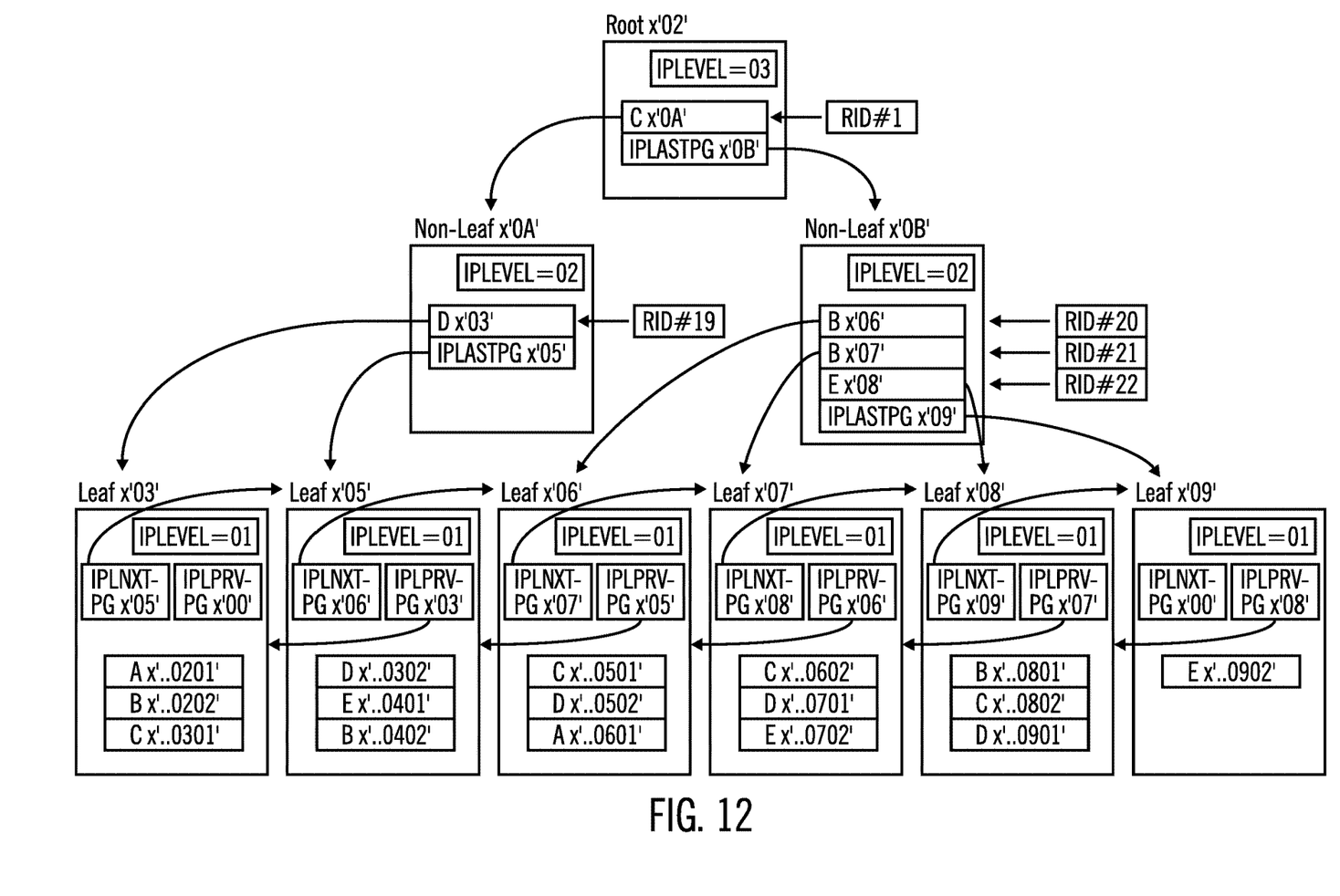
FIG. 12 illustrates an example of a sub-index for a last component key of the composite key in accordance with described embodiments.

FIG. 12 illustrates an example of the second sub-index having component key values for the second or last component key of the composite keys shown in the nodes in FIG. 10. The leaf nodes of FIG. 12 provide the second component key value for the composite keys in the leaf nodes of the uncompressed index of FIG. 10, with the record IDs for the composite keys in the uncompressed index.

The present invention may be a system, a method, and/or a computer program product. The computer program product may include a computer readable storage medium (or media) having computer readable program instructions thereon for causing a processor to carry out aspects of the present invention.

Reference characters used herein, such as i, j, k, l, m, n, among others, may refer to a same or different number of the elements to which they apply in different instances.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 13:
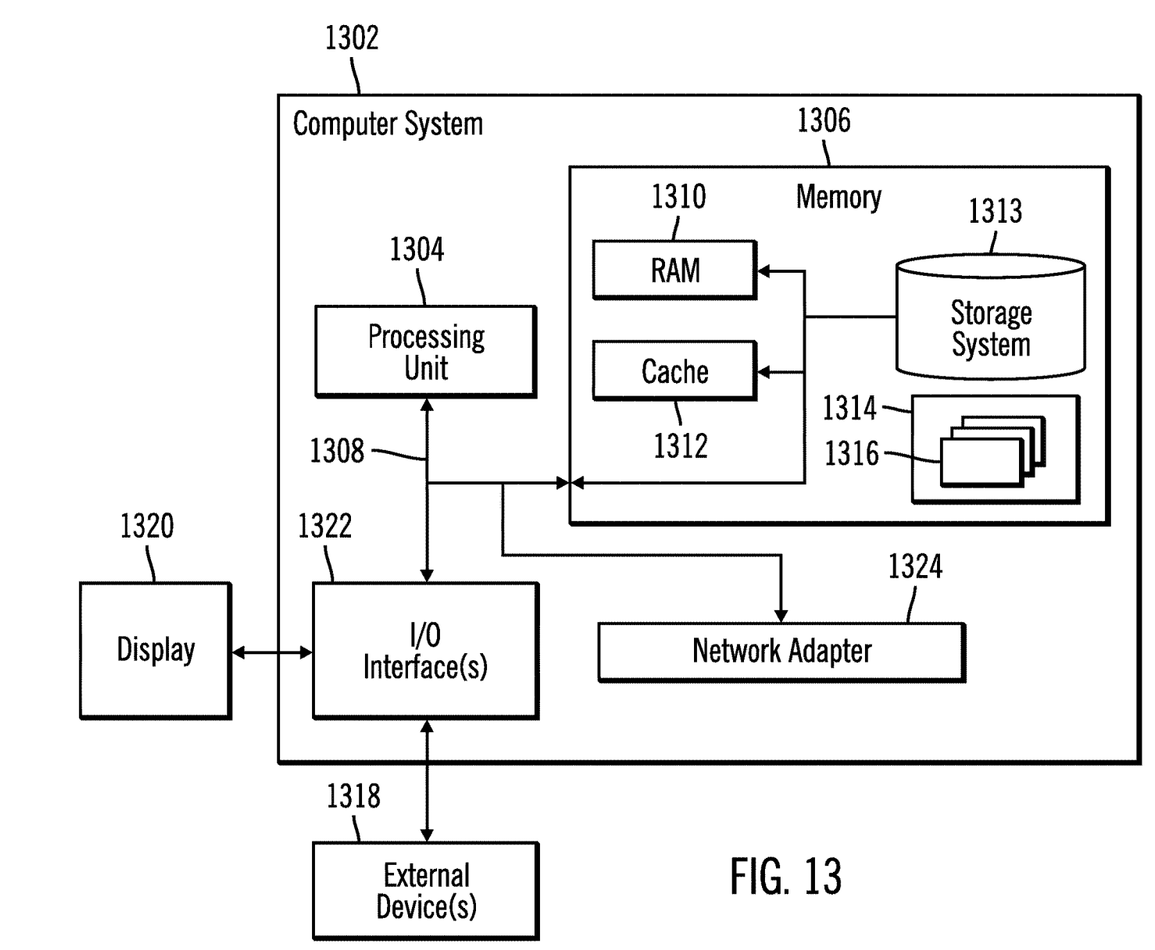
FIG. 13 illustrates an embodiment of an implementation of a computing system.

The computer 100 of FIG. 1 may be implemented in one or more computer systems, such as the computer system 1302 shown in FIG. 13. Computer system/server 1302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, the computer system/server 1302 is shown in the form of a general-purpose computing device. The components of computer system/server 1302 may include, but are not limited to, one or more processors or processing units 1304, a system memory 1306, and a bus 1308 that couples various system components including system memory 1306 to processor 1304. Bus 1308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1302 typically includes a variety of computer system readable media. Such media may be any available media that is accessible by computer system/server 1302, and it includes both volatile and non-volatile media, removable and non-removable media.

System memory 1306 can include computer system readable media in the form of volatile memory, such as random access memory (RAM) 1310 and/or cache memory 1312. Computer system/server 1302 may further include other removable/non-removable, volatile/non-volatile computer system storage media. By way of example only, storage system 1313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1308 by one or more data media interfaces. As will be further depicted and described below, memory 1306 may include at least one program product having a set (e.g., at least one) of program modules that are configured to carry out the functions of embodiments of the invention.

Program/utility 1314, having a set (at least one) of program modules 1316, may be stored in memory 1306 by way of example, and not limitation, as well as an operating system, one or more application programs, other program modules, and program data. Each of the operating system, one or more application programs, other program modules, and program data or some combination thereof, may include an implementation of a networking environment. The components of the computer 1302 may be implemented as program modules 1316 which generally carry out the functions and/or methodologies of embodiments of the invention as described herein. The systems of FIG. 1 may be implemented in one or more computer systems 1302, where if they are implemented in multiple computer systems 1302, then the computer systems may communicate over a network.

Computer system/server 1302 may also communicate with one or more external devices 1318 such as a keyboard, a pointing device, a display 1320, etc.; one or more devices that enable a user to interact with computer system/server 1302; and/or any devices (e.g., network card, modem, etc.) that enable computer system/server 1302 to communicate with one or more other computing devices. Such communication can occur via Input/Output (I/O) interfaces 1322. Still yet, computer system/server 1302 can communicate with one or more networks such as a local area network (LAN), a general wide area network (WAN), and/or a public network (e.g., the Internet) via network adapter 1324. As depicted, network adapter 1324 communicates with the other components of computer system/server 1302 via bus 1308. It should be understood that although not shown, other hardware and/or software components could be used in conjunction with computer system/server 1302. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for compressing an index for database records in a database, the computer program product comprising a computer readable storage medium having computer readable program code embodied therein that executes to perform operations, the operations comprising:

providing an index comprised of a plurality of levels of nodes having composite keys comprised of component keys comprised of component key values;

generating a plurality of sub-indexes for the component keys in the composite keys for the nodes in the index, including one sub-index for each component key of the component keys from the composite keys, wherein each sub-index corresponds to a position number of a position of a component key in a composite key;

generating nodes in each sub-index corresponding to nodes in the index;

for each sub-index corresponding to a position number of a component key in a composite key, generating, in each node of the nodes of the sub-index corresponding to a node in the index, component key values at the corresponding position number in the composite keys in the corresponding node of the index; and searching the sub-indexes to search for a record matching a search composite key value in the database using component key values of the search composite key value in a search query to return a record for a leaf node in one of the searched sub-indexes having a component key value matching a component key value of the search composite key value.

2. The computer program product of claim 1, wherein each sub-index includes a root node corresponding to a root node of the index and a number of levels of the index, following the root node of the index, comprising a number of a position of the component key in the composite key for which the sub-index is generated.

3. The computer program product of claim 1, wherein in at least one sub-index of the sub-indexes, the nodes at one of the levels provides only one component key value when there are multiple instances of the component key value in composite keys in one of the nodes.

4. The computer program product of claim 1, wherein the operations further comprise:
assigning a unique relationship identifier to each composite key in each non-leaf node of the index; and
for each component key value in the nodes of each sub-index of the sub-indexes, assigning the unique relationship identifier assigned to the composite key in the index for which the component key value was generated.

5. The computer program product of claim 4, wherein the generating the component key value in each node of the nodes of the sub-index comprises:
in response to multiple composite keys in the node of the index having a same component key value, performing:
generating the same component key value in the node of the sub-index corresponding to the node in the index having the multiple composite keys having the same component key value; and
assigning unique relationship identifiers of the multiple composite keys to the same component key value in the node of the sub-index.

6. The computer program product of claim 5, wherein the assigning the unique relationship identifiers of the multiple composite keys to the same component key value is performed for non-leaf nodes at a level number of the sub-index that is a number of a position of the component key in the composite key for which the sub-index was generated.

7. The computer program product of claim 4, wherein the generating in each node of the nodes of the sub-index a component key value comprises:
for each of the nodes at a level number of the sub-index that is not the position number of a position of the component key in the composite key for which the sub-index is generated, performing:
generating one component key value for each composite key in the node; and
assigning to each generated component key value the unique relationship identifier assigned to the composite key from which the component key value was generated.

8. The computer program product of claim 4, wherein a last level of the sub-index for the component key comprising a last component key of the composite key comprises leaf nodes of the index, wherein the generating in each leaf node of the sub-index for the last component key comprises:
generating one component key value, for the component key for which the sub-index was generated, for each composite key value in the leaf node; and
assigning to each generated component key value a record identifier of the record in the database identified by the composite key from which the component key value was generated.

9. The computer program product of claim 1, wherein the searching the sub-indexes further comprises:
for each component key value of the search composite key value in the search query, use the component key value to search a sub-index for the component key to locate a component key value in a node of the sub-index; and
using the located component key value from the sub-index to determine a component key value in a node in a next sub-index at which to start searching.

10. The computer program product of claim 9, wherein the operations further comprise performing for a last sub-index:
using the located component key value from a sub-index preceding the last sub-index to determine a component key value in a node in the last sub-index at which to start searching;
using a last component key value in the search composite key value to search from the determined component key value in the node of the last sub-index to reach a leaf node having the last component key value; and
returning to the search query the record associated with the last component key value in the leaf node having the last component key value in the search composite key value.

11. The computer program product of claim 9, wherein the using the located component key value from each sub-index to determine a component key value in a node in the next sub-index at which to start searching comprises:
determining at least one unique relationship identifier of the search composite key value including the determined component key value, wherein the determined component key value in the next sub-index comprises each component key value having the determined at least one unique relationship identifier.

12. A system for compressing an index for database records in a database, comprising:
a processor; and
an index comprised of a plurality of levels of nodes having composite key values comprised of component keys comprised of component key values;
a computer readable storage medium having computer readable program code embodied therein that executes to perform operations, the operations comprising:
generating a plurality of sub-indexes for the component keys in the composite keys for the nodes in the index, including one sub-index for each component key of the component keys from the composite keys, wherein each sub-index corresponds to a position number of a position of a component key in a composite key;
generating nodes in each sub-index corresponding to nodes in the index;
for each sub-index corresponding to a position number of a component key in a composite key, generating, in each node of the nodes of the sub-index corresponding to a node in the index, component key values at the corresponding position number in the composite keys in the corresponding node of the index; and
searching the sub-indexes to search for a record matching a search composite key value in the database using component key values of the search composite key value in a search query to return a record for a leaf node in one of the searched sub-indexes having a component key value matching a component key value of the search composite key value.

13. The system of claim 12, wherein each sub-index includes a root node corresponding to a root node of the index and a number of levels of the index, following the root node of the index, comprising a number of a position of the component key in the composite key for which the sub-index is generated.

14. The system of claim 12, wherein the operations further comprise:
assigning a unique relationship identifier to each composite key value in each non-leaf node of the index; and for each component key value in the nodes of each sub-index of the sub-indexes, assigning the unique relationship identifier assigned to the composite key value in the index for which the component key value was generated.

15. The system of claim 14, wherein the generating the component key value in each node of the nodes of the sub-index comprises:

in response to multiple composite keys in the node of the index having a same component key value, performing:
generating the same component key value in the node of the sub-index corresponding to the node in the index having the multiple composite keys having the same component key value; and
assigning unique relationship identifiers of the multiple composite keys to the same component key value in the node of the sub-index.

16. The system of claim 14, wherein a last level of the sub-index for the component key comprising a last component key of the composite key comprises leaf nodes of the index, wherein the generating in each leaf node of the sub-index for the last component key comprises:

generating one component key value, for the component key for which the sub-index was generated, for each composite key value in the leaf node; and
assigning to each generated component key value a record identifier of the record in the database identified by the composite key from which the component key value was generated.

17. The system of claim 12, wherein the searching the sub-indexes further comprises:

for each component key value of the search composite key value in the search query, use the component key value to search a sub-index for the component key to locate a component key value in a node of the sub-index; and
using the located component key value from the sub-index to determine a component key value in a node in a next sub-index at which to start searching.

18. A method for compressing an index for database records in a database in a computer storage device, comprising:

providing an index in the computer storage device comprised of a plurality of levels of nodes having composite keys comprised of component keys comprised of component key values;
generating a plurality of sub-indexes for the component keys in the composite keys for the nodes in the index in the computer storage device, including one sub-index for each component key of the component keys from the composite keys, wherein each sub-index corresponds to a position number of a position of a component key in a composite key;
generating nodes in each sub-index corresponding to nodes in the index;
for each sub-index corresponding to a position number of a component key in a composite key, generating, in each node of the nodes of the sub-index corresponding to a node in the index, component key values at the corresponding position number in the composite keys in the corresponding node of the index; and
searching the sub-indexes to search for a record matching a search composite key value in the database using component key values of the search composite key value in a search query to return a record for a leaf node in one of the searched sub-indexes having a component key value matching a component key value of the search composite key value.

19. The method of claim 18, wherein each sub-index includes a root node corresponding to a root node of the index and a number of levels of the index, following the root node of the index, comprising a number of a position of the component key in the composite key for which the sub-index is generated.

20. The method of claim 18, further comprising:

assigning a unique relationship identifier to each composite key value in each non-leaf node of the index; and
for each component key value in the nodes of each sub-index of the sub-indexes, assigning the unique relationship identifier assigned to the composite key value in the index for which the component key value was generated.

21. The method of claim 20, wherein the generating the component key value in each node of the nodes of the sub-index comprises:

in response to multiple composite keys in the node of the index having a same component key value, performing:
generating the same component key value in the node of the sub-index corresponding to the node in the index having the multiple composite keys having the same component key value; and
assigning unique relationship identifiers of the multiple composite keys to the same component key value in the node of the sub-index.

22. The method of claim 20, wherein a last level of the sub-index for the component key comprising a last component key of the composite key comprises leaf nodes of the index, wherein the generating in each leaf node of the sub-index for the last component key comprises:

generating one component key value, for the component key for which the sub-index was generated, for each composite key value in the leaf node; and
assigning to each generated component key value a record identifier of the record in the database identified by the composite key from which the component key value was generated.

23. The method of claim 18, wherein the searching the sub-indexes further comprises:

for each component key value of the search composite key value in the search query, use the component key value to search a sub-index for the component key to locate a component key value in a node of the sub-index; and
using the located component key value from the sub-index to determine a component key value in a node in a next sub-index at which to start searching.

* * * * *